US009229988B2

(12) United States Patent
Vadrevu et al.

(10) Patent No.: US 9,229,988 B2
(45) Date of Patent: Jan. 5, 2016

(54) RANKING RELEVANT ATTRIBUTES OF ENTITY IN STRUCTURED KNOWLEDGE BASE

(71) Applicant: Microsoft Corporation, Redmond, WA (US)

(72) Inventors: Srinivas Vadrevu, Milpitas, CA (US); Ying Tu, Sunnyvale, CA (US); Franco Salvetti, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 13/744,416

(22) Filed: Jan. 18, 2013

(65) Prior Publication Data

US 2014/0207763 A1    Jul. 24, 2014

(51) Int. Cl.
*G06F 17/30*     (2006.01)

(52) U.S. Cl.
CPC ...... *G06F 17/3053* (2013.01); *G06F 17/30604* (2013.01); *G06F 17/30943* (2013.01)

(58) Field of Classification Search
CPC ............ G06F 17/303; G06F 17/30306; G06F 17/30079; G06F 17/30569; G06F 17/30563; G06F 17/30575; G06F 17/2264
See application file for complete search history.

(56) References Cited

U.S. PATENT DOCUMENTS

| 7,664,727 | B2 * | 2/2010 | Van Doan | ......... G06F 17/30687 |
| | | | | 707/693 |
| 7,917,483 | B2 * | 3/2011 | Chang | ........................... 707/705 |
| 8,655,886 | B1 * | 2/2014 | Gross | ........................... 707/741 |
| 2003/0088458 | A1 * | 5/2003 | Afeyan | .................... G06F 17/50 |
| | | | | 706/13 |
| 2007/0265996 | A1 * | 11/2007 | Odom et al. | ....................... 707/1 |
| 2009/0144609 | A1 * | 6/2009 | Liang et al. | .................... 715/230 |
| 2009/0319342 | A1 * | 12/2009 | Shilman et al. | ................. 705/10 |
| 2010/0114886 | A1 * | 5/2010 | Cain et al. | ..................... 707/737 |
| 2010/0318537 | A1 | 12/2010 | Surendran et al. | |
| 2011/0137730 | A1 * | 6/2011 | McCarney et al. | ........ 705/14.58 |
| 2012/0005204 | A1 * | 1/2012 | Diaz et al. | ..................... 707/733 |
| 2012/0089617 | A1 | 4/2012 | Frey | |
| 2012/0158633 | A1 * | 6/2012 | Eder | .............................. 706/46 |
| 2014/0095493 | A1 * | 4/2014 | Feuersanger et al. | ......... 707/728 |

OTHER PUBLICATIONS

Topic: tf—idf from wikipedia webpage. Webpage address is http://en.wikipedia.org/wiki/Tf%E2%80%93idf accessed on Jan. 7, 2015.*

(Continued)

*Primary Examiner* — Angelica Ruiz
(74) *Attorney, Agent, or Firm* — David Ream; Douglas Barker; Mickey Minhas

(57) ABSTRACT

Architecture that addresses at least the problem of ranking the relevant attributes for a given entity within the context of a structured knowledge base (SKB). The architecture utilizes the attribute, entity type statistics, and the taxonomy of the attributes to consistently and efficiently rank attributes for each and every type of entity in the SKB. Using the SKB, intermediate features are computed, including the importance or popularity each entity type for every entity, inverse document frequency (IDF) computation for each attribute on a global basis, IDF computation for entity types, and the popularity of attributes for each entity type. The intermediate features are aggregated to obtain a final feature set, which can be used in combination with human judgments to train a machine learned classifier model to produce and predict a relevance score for a given entity and each of its attributes. The attributes are ranked for each entity using this score.

20 Claims, 8 Drawing Sheets

(56) References Cited

OTHER PUBLICATIONS

Kang, et al., "Ranking Related Entities for Web Search Queries", Retrieved at <<http://wwwconference.org/www2011/proceeding/companion/p67.pdf>>, In the proceedings of the 20th international conference companion on World wide web, Mar. 28, 2011, 2 Pages.
Contillo, Ben, "Entity Search: Google Knowledge Graph", Retrieved at <<http://blog.grovo.com/2012/05/google-knowledge-graph/>>, May 25, 2012, 3 Pages.
Editorial, Brafton, "Bing rolls out Brittanica Online Encyclopedia Answers, counters Google's Knowledge Graph", Retrieved at <<http://www.brafton.com/news/bing-rolls-out-brittanica-online-encyclopedia-answers-counters-googles-knowledge-graph>>, Jun. 12, 2012, 3 Pages.
Kasneci, et al., "NAGA: Searching and Ranking Knowledge", Retrieved at <<http://www.mpi-inf.mpg.de/yago-naga/naga/download/ICDE08_conference_320.pdf>>, In the proceeding of IEEE 24th International Conference on Data Engineering, Apr. 7, 2008, 10 Pages.

\* cited by examiner

RANKING RELEVANT ATTRIBUTES OF ENTITY IN STRUCTURED KNOWLEDGE BASE

BACKGROUND

In order to create an automated software encyclopedia as an entity-rich experience that provides a quick summary of a reference topic, it is desirable to build an entity-specific page that lists key attributes pertaining to the entity and the associated appropriate values. However, it is often not a trivial task to decide the key attributes that can be chosen to be present in the entity-specific page.

For reference topics in an online encyclopedia, such as popular persons, popular locations, and important topics, it is often useful to provide a succinct summary of the topic in order to quickly understand the gist of that particular topic. The topic summaries in an online encyclopedia or the other structured knowledge base reference pages, for example, usually contain a brief summary of the topic, and key attributes such as date of birth (if a person), area (if a location), etc., which are manually created. However, each entity may have several attributes, and some attributes can be obscure and not useful, such as movies shot in a specific location and guest appearances in television shows for a popular celebrity. A challenge is then building a topic/entity centered experience in an automated fashion that can scale to millions of entities.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture addresses at least the problem of ranking the relevant attributes for a given entity (also referred to as the topic or concept) within the context of a structured knowledge base. The architecture utilizes the attribute, entity type statistics, and the taxonomy of the attributes to consistently and efficiently rank attributes for each and every type of entity in the knowledge base.

Generally, the architecture begins with the structured knowledge base. In a first phase, several intermediate features are computed, including the importance or popularity each entity type for every entity, inverse document frequency (IDF) computation for each attribute on a global basis, IDF computation for entity types, and the popularity of attributes for each entity type. The intermediate features are aggregated in several ways to obtain a final feature set, which comprises the set of features for each tuple, for example, an {entity, attribute} pair, an {entity, attribute, value} triple, etc.

Another input can be a set of judgments, from human expert judges, about the relevance of each attribute to the entity. A machine learned classifier model is then trained with the entity-attribute feature set and the corresponding human judgments to produce a relevance score for a given entity and one of its attributes. The attributes are then ranked for each entity using this score and relevant attributes are chosen based on the particular use of the architecture.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
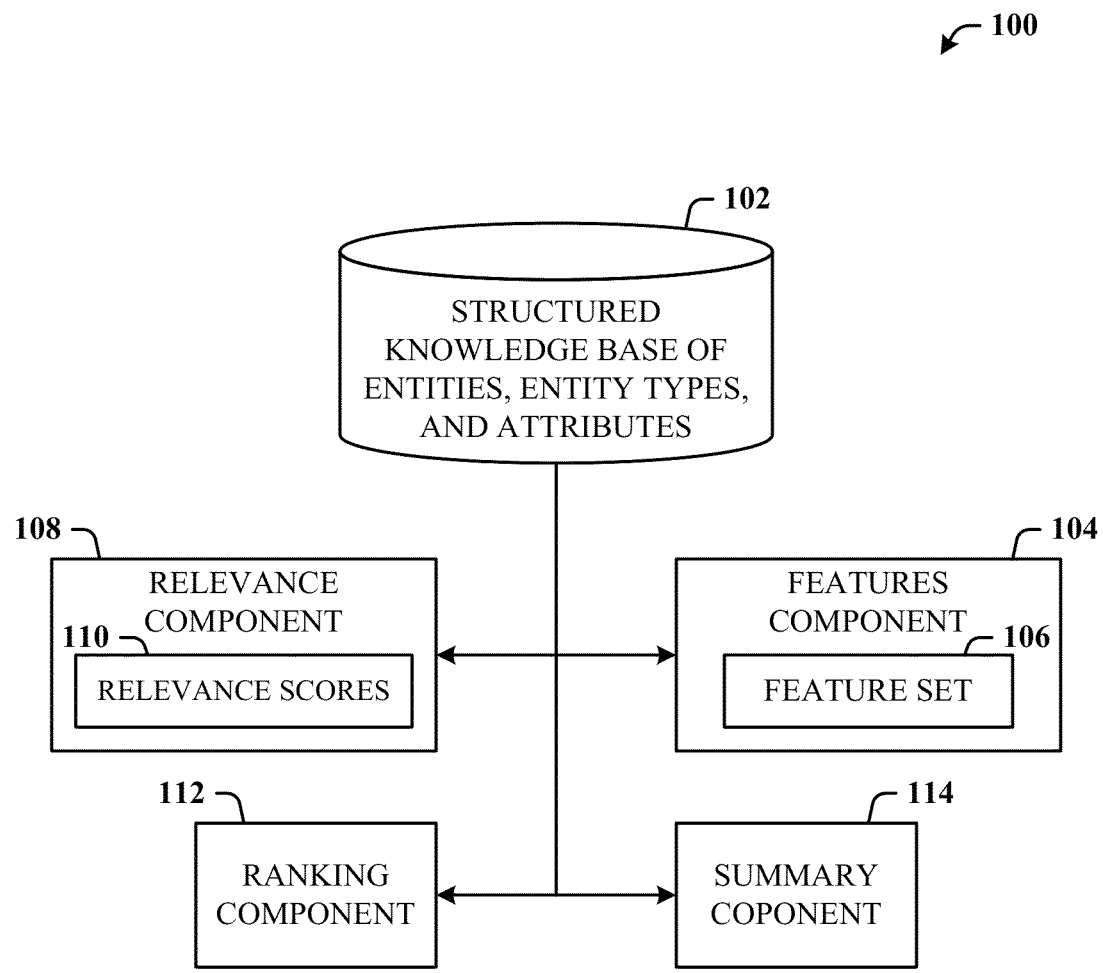
FIG. 1 illustrates a system in accordance with the disclosed architecture.

A structured and reasonably complete knowledge base may contain several pieces of information about an entity that only provides additional and tangential information for the entity, and may not constitute a critical summary of the entity. Accordingly, a challenge is to build a topic/entity centered experience in an automated fashion that can scale to millions of entities that can rank, select, and showcase the desired attributes and associated values.

The disclosed architecture addresses at least the problem of ranking the relevant attributes for a given entity within the context of a structured knowledge base. The architecture utilizes the attribute, entity type statistics, and the taxonomy of the attributes to consistently and efficiently rank attributes for each and every type of entity in the knowledge base.

As an illustrated application of the disclosed architecture, two structured knowledge sources are considered—Encyclopedia Britannica™ and Freebase™. The architecture automatically generates attribute rich entity summaries that contain a brief description about the entity and, lists key attributes and attribute values in an order of importance. This can represent how the entity is popularly and commonly known. The architecture can provide an attribute rich entity summary experience for millions of entities that belong to various entity types, including but not limited to, people, locations, movies, music, species, diseases, etc. When available, the architecture can also augment the attribute rich entity summary experience with a brief description about the entity.

A component in the entity summary experience is ranking and selecting highly relevant attributes for all entity types. For example, the key attributes for a location can be population and capital, while the key attributes for a person can be date and place of birth. Thus, attribute selection and ranking depends on the types of entities and, the importance and popularity of the associated attributes.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include a knowledge base 102 of entities, entity types, and entity attributes, and a features component 104 that computes intermediate features of the entities and attributes. The features component 104 aggregates the intermediate features to output a final feature set 106 of features for each entity-attribute tuple.

A relevance component 108 generates a relevance scores 110 for a given entity and associated attributes based on the feature set 106. A ranking component 112 ranks the attributes of the given entity based on the relevance scores 110.

The features component 104 computes the importance (as a value) of each entity type for each entity as an intermediate feature, and computes popularity (as a value) of the attributes for each entity type as an intermediate feature. The features component 104 computes term frequency compensation for each attribute on a global basis as an intermediate feature, and term frequency compensation for each entity type as an intermediate feature. The features can be computed separately or in combination with available metadata, as well, where the metadata is not necessarily obtained from the one or more knowledge bases being processed.

Figure 2:
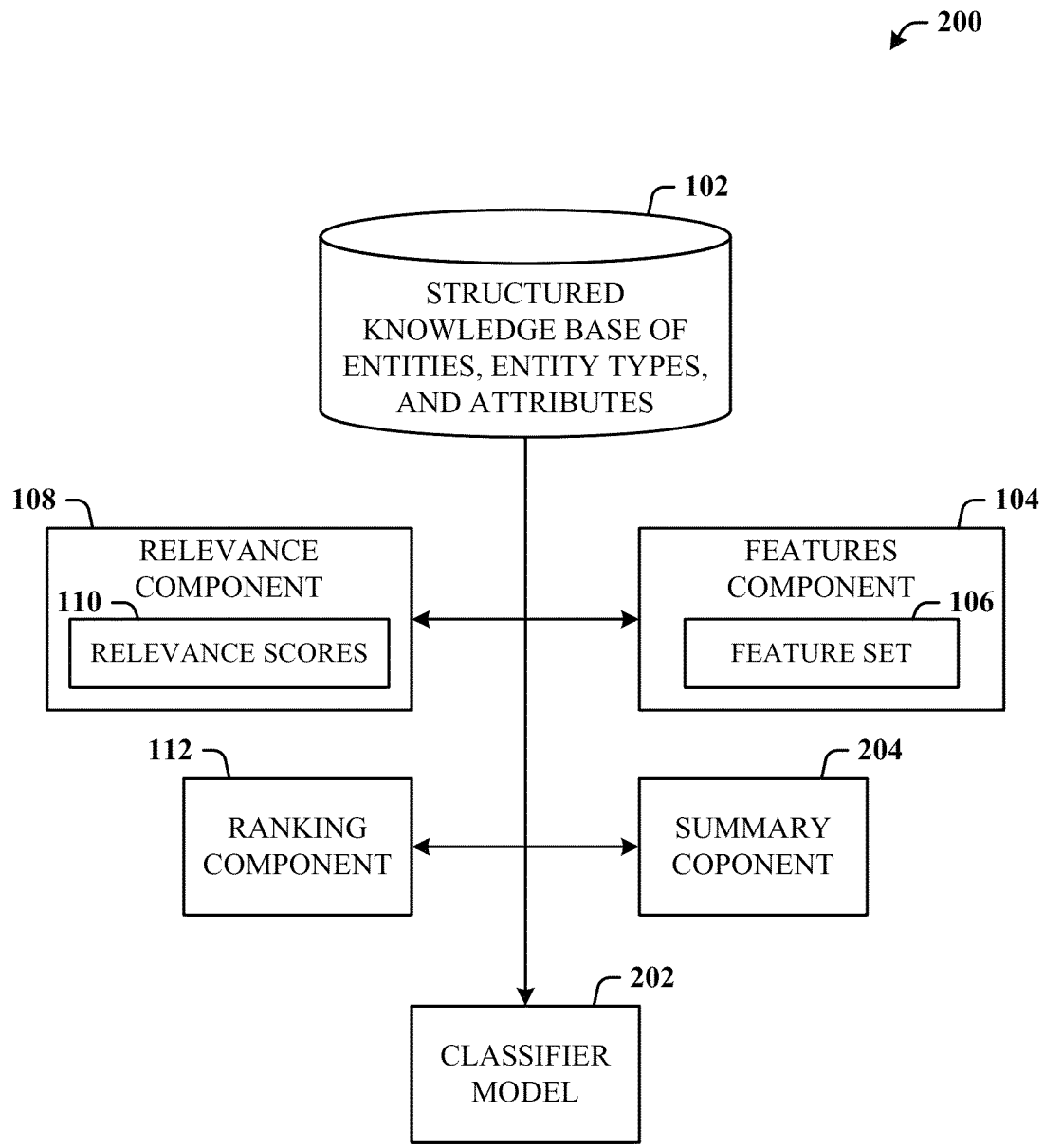
FIG. 2 illustrates an alternative system further classifies and provides summaries for presentation.

FIG. 2 illustrates an alternative system 200 further classifies and provides summaries for presentation. The system 200 comprises the components and capabilities described above in association with system 100, but additionally, comprises a machine learned classifier model 202 that is trained using the feature set 106 to output the relevance scores 110 for the given entity and the associated attributes. The classifier model 202 can be trained to generate a relevance score for a given entity and associated attribute. Alternatively, the classifier model 202 is trained using the final feature set and a set of judgments to generate the relevance score for the given entity and associated attribute. A summary component 204 generates entity summaries that when presented include a brief description of the entity and lists key attributes and associated values in an order of importance to represent and depict for what the entity is popularly and commonly known.

A microprocessor of a computing system can execute computer-executable instructions associated with at least one of the features component 104, the relevance component 108, the ranking component 112, the classifier model 202, and/or the summary component 204.

Figure 3:
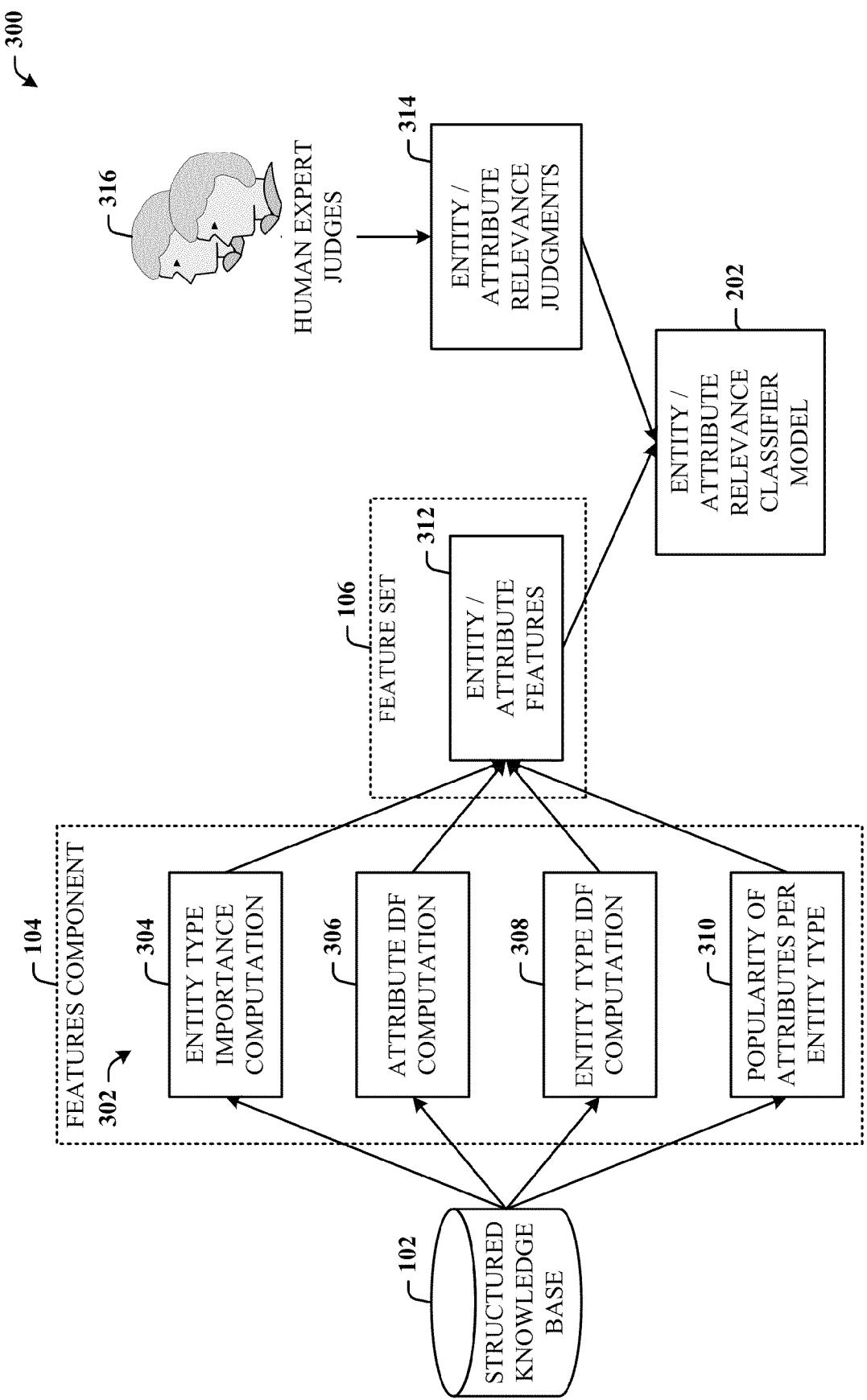
FIG. 3 illustrates a system that provides relevant attribute ranking for an entity of a structured knowledge base.

FIG. 3 illustrates a system 300 that provides relevant attribute ranking for an entity of a structured knowledge base. The system 300 includes the structured knowledge base 102 from which the features component 104 extracts different intermediate features 302. For example, a first feature computation 304 is importance of an entity type, a second feature computation 306 is attribute IDF, a third feature computation 308 is entity type IDF, and a fourth feature computation 310 is the popularity of attributes per entity type. Other features can be extracts as desired. The output of the features component 104 is the final feature set 106 of entity-attribute feature tuples (e.g., pairs, triples (add a value), etc.). The final feature set 106 is then used in training the classifier model 202 for relevance determination of the attributes to the entities.

Put another way, generally, the process begins with the structured knowledge base 102 (e.g., Freebase). In a first phase, several intermediate features 302 are computed, including the importance or popularity each entity type for every entity (the first feature computation 304), IDF computation for each attribute on a global basis (the first feature computation 306), IDF computation for entity types (the third feature computation 308), and the popularity of attributes for each entity type (the fourth feature computation 310). These intermediate features 302 are aggregated in several ways to obtain the final feature set 106, which comprises the set of features for each tuple, for example, an {entity, attribute} pair, an {entity, attribute, value} triple, etc.

Another input to the system 300 can be a set of judgments 314, from human expert judges 316, about the relevance of each attribute to the entity. Finally, the classifier model 202 is trained with the entity-attribute feature set 106 and the corresponding human judgments 314, to produce a relevance score for a given entity and one of its attributes. The attributes are then ranked for each entity using this score.

Note that the human judgments 314 are optional, and in the absence of the judgments 314, a simple aggregation function (with appropriate weights to each feature) can be used to aggregate the features to obtain a single relevance score (value) for each entity and one of its attributes.

The following description is a progression from a basic or naïve technique to the desirable method for relevant attribute ranking for an entity of a structured knowledge base.

A naïve method of ranking attributes for an entity in a structured knowledge base is to rank the attributes by global popularity in the entire knowledge base. For this method, the attribute score for a given entity e and an attribute $a_i$ which is used for ranking the relevant attributes for the entity, is defined by the following:

$$S(e,a_i)=f(a_i),$$

where $f(a_i)$ is the frequency of the attribute $a_i$.

However, the naïve method is biased by the most popular entity type and the corresponding attribute in the knowledge base. Since the method does not consider the entity type, this method returns the same attribute for different types of entities. For example, for a popular music artist, but who only acted in a few movies, the most relevant attributes are the artist's music albums produced and the popular titles. However, if the knowledge base contains many movie actors, rather than music artists, a "movies starred" attribute will rank higher, which is not desired. To address this inconsistency, type of the entity can be considered, and the cumulative sum of the attribute popularities in all of the types that the entity belongs is computed as the score of the attribute, which is defined by the following:

$$S(e,a_i)=\Sigma_t f(a_i,t),$$

where $f(a_i, t)$ is the frequency of the attribute $a_i$ within the entity type t.

This method overcomes the problem of ignoring the entity types, and thus, returns the relevant attributes for each entity. However, for an entity such as "Barack Obama", it is desirable to return the attributes related to his presidency (his Vice President, the date when he assumed the office, etc.). However, when aggregating all the attributes from all the entity types, the result may be attributes such as his date and place of birth, since these attributes are the most popular for all persons. Since very few people are President of United States, the presidential attributes will not surface when only considering the popular attributes. This is a classic problem in the area of information retrieval and a well-known technique such as inverse document frequency (IDF) can be used to address this issue. Accordingly, the method progresses to the following:

$$S(e,a_i)=\Sigma_t f(a_i,t)*I(a_i),$$

where f($a_i$) is the frequency of the attribute $a_i$, and I($a_i$) is the IDF of attribute $a_i$ defined as $$I(a_i) = \log \frac{|T|}{|t_i| \exists\, a_i \in t_i},$$

where attribute $a_i$ occurs in entity type $t_i$, and |T| is the cardinality of T, the total number of terms in the corpus.

This latest method can accurately assign a score to each attribute such that the most relevant attributes are ranked higher for each attribute. Since this addresses both the global popularity of the entity and that certain attributes are special to certain types of entities, this method can effectively surface the most relevant attributes for a given entity.

When addressing practical situations to avoid some attributes being ranked high for certain entity types, for example, if an entity has multiple special entity types, this method may treat the types equally and assign equal scores to attributes from those two types. However, it is understood that certain entity types are more important than others (e.g., presidential attributes are more important to Barack Obama than the book-author related attributes that Obama may also have). To overcome this issue, the entity types for each entity are ranked by relevance to the entity, and this relevance score is then used as an additional weight to the final attribute score. Thus the final attribute ranking score can be written as, $$S(e,a_i) = \Sigma_t w(e,t) * f(a_i,t) * I(a_i),$$

where w(t) is the relative importance of the entity type t to a specific entity.

An extension of this latest ranking method is to utilize machine learned ranking techniques that are employed in the area of information retrieval and use various scores that are generated as features and human judgments as the target.

Gradient boosted decision trees, which have proven to be effective in information retrieval systems, can be used to train the machine learned classifier that predicts the relevance of a given attribute to an entity with known entity types. The resulting attribute ranking system performs effectively and is able to rank and identify important attributes for various types of entities, including people, locations, rivers, mountains, and astronomical objects.

Following are examples of entity summaries where the top attributes are shown for various attribute types (e.g., the top two attributes for each entity).

Figure 4:
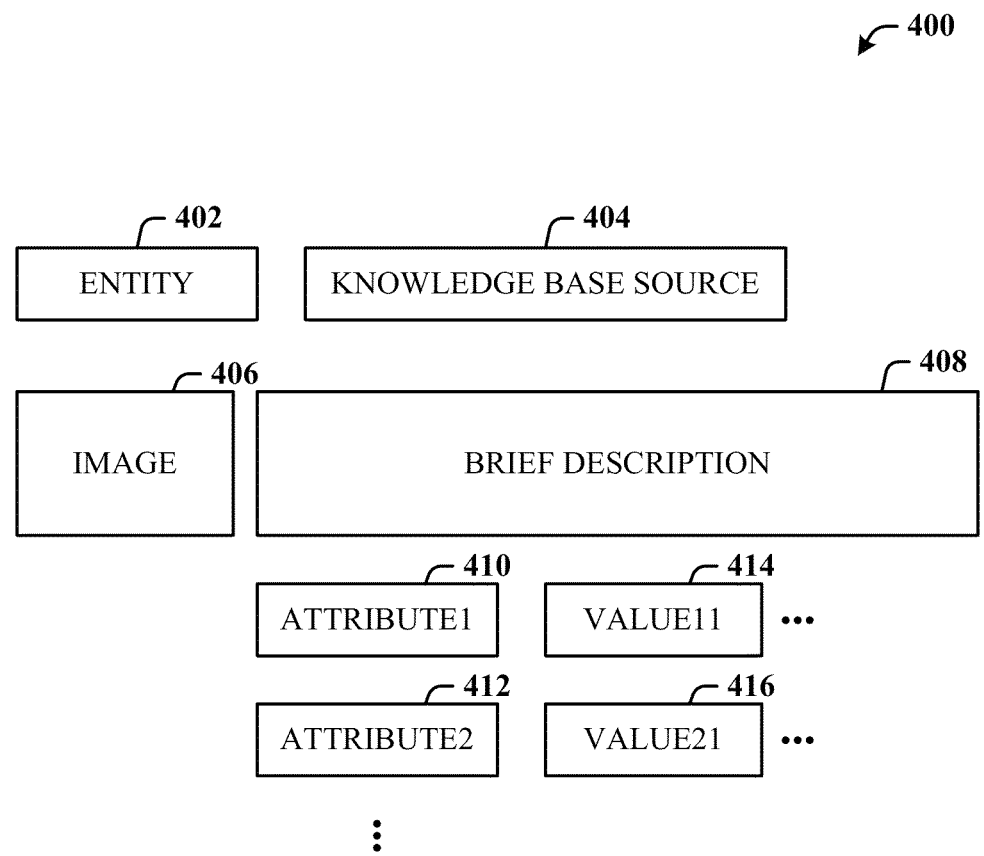
FIG. 4 illustrates an entity summary in accordance with the disclosed architecture.

FIG. 4 illustrates an entity summary 400 in accordance with the disclosed architecture. The summary 400 includes an entity 402 (e.g., name of person) and a knowledge base source 404 (name of the associated structured knowledge base from which the summary is derived). The summary 400 may also include an image 406 extracted and relevant to the entity (e.g., a photo of the entity). A brief description 408 provides a small set of information about the entity 402 which can include a link to the source of the set of information. In this exemplary summary 400, two of the top attributes are derived and presented: a first attribute 410 and a second attribute 412. The first attribute 410 includes a value 414, and the second attribute 412 includes a value 416. Additional attributes and values can be derived and presented in the summary 400 as desired.

In particular, if the entity 402 is a famous religious person, the image 406 can be of the person, the brief description 408 can be about the person and the religion, the first attribute 410 can be the most popular item, such as date of birth (with the value 414 indicating the birthdate), and the second attribute 412 can be the second most popular item, such as religion founded (with the value 416 indicating the name of the religion).

Figure 5:
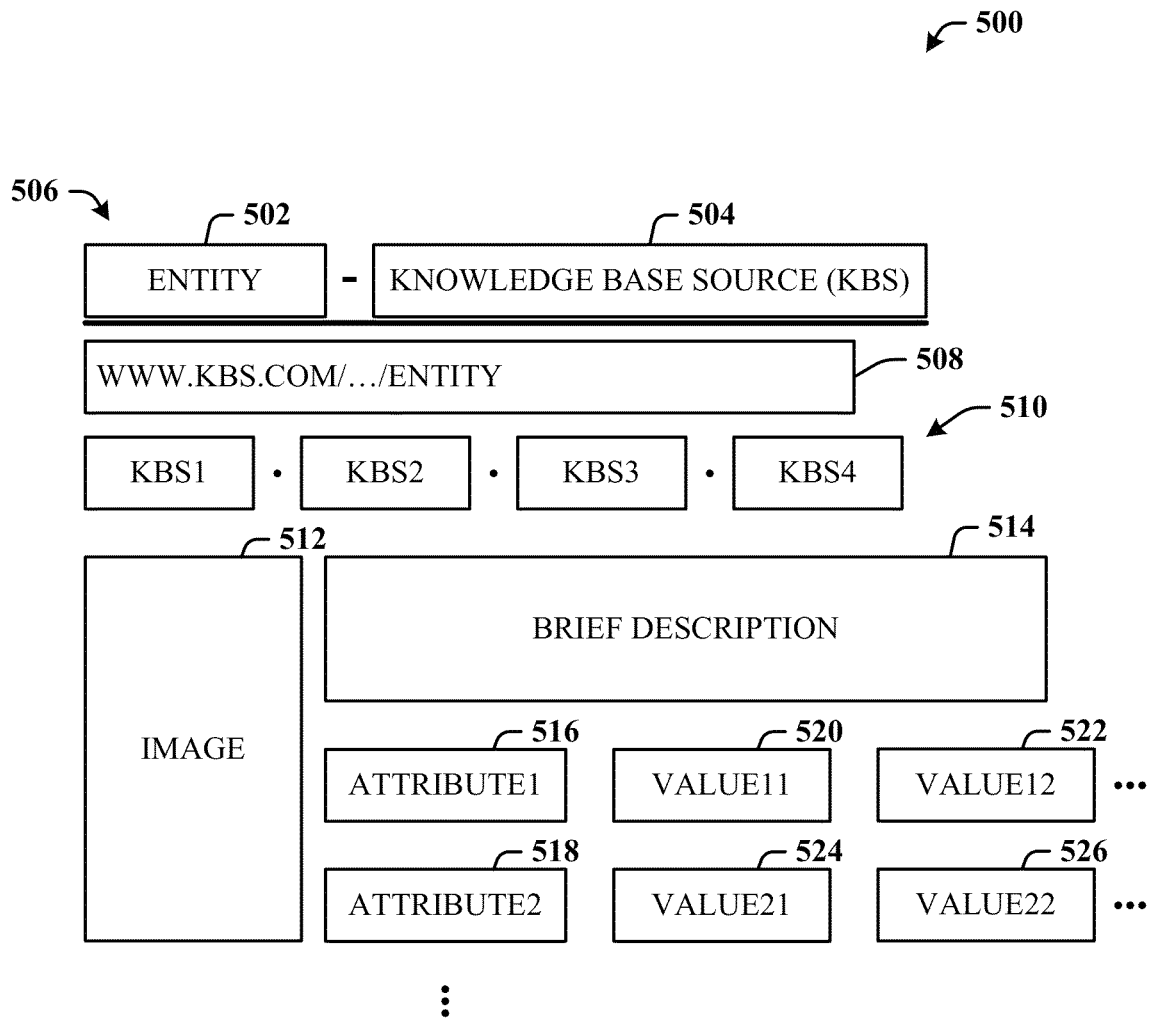
FIG. 5 illustrates a search result summary in accordance with the disclosed architecture.

FIG. 5 illustrates a search result summary 500 in accordance with the disclosed architecture. The summary 500 includes an entity 502 (e.g., name of a person) and a knowledge base source 504 (name of the associated structured knowledge base from which the summary is derived). The entity 502 and knowledge base source 504 are combined as a selectable object 506 that links to a related web document.

The summary 500 may also include a link 508 that enables navigation to the source document. Below the link 508 can be multiple links 510 to knowledge base sources (KBSx), such as other sources. The summary 500 may also include an image 512 relevant to the entity 502 (e.g., a photo of the entity). A brief description 514 provides a small set of information about the entity 502 which can include a link to the source of the set of information. In this exemplary summary 500, two of the top attributes are derived and presented: a first attribute 516 and a second attribute 518. The first attribute 516 includes an associated first value 520 and a second value 522, and the second attribute 518 an associated third value 524 and a fourth value 526. Additional attributes and values can be derived and presented in the summary 500 as desired.

In one example, if the entity 502 is a famous scientist, the image 512 can be of the person, the brief description 514 can be about the person and the contributions to science, the first attribute 516 can be the most popular item, such as date of birth (with the first value 520 indicating the birthdate and the second value 522 indicating the place of birth), and the second attribute 518 can be the second most popular item, such as date of death (with the third value 524 indicating the date of death and the fourth value 526 being the place of death).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
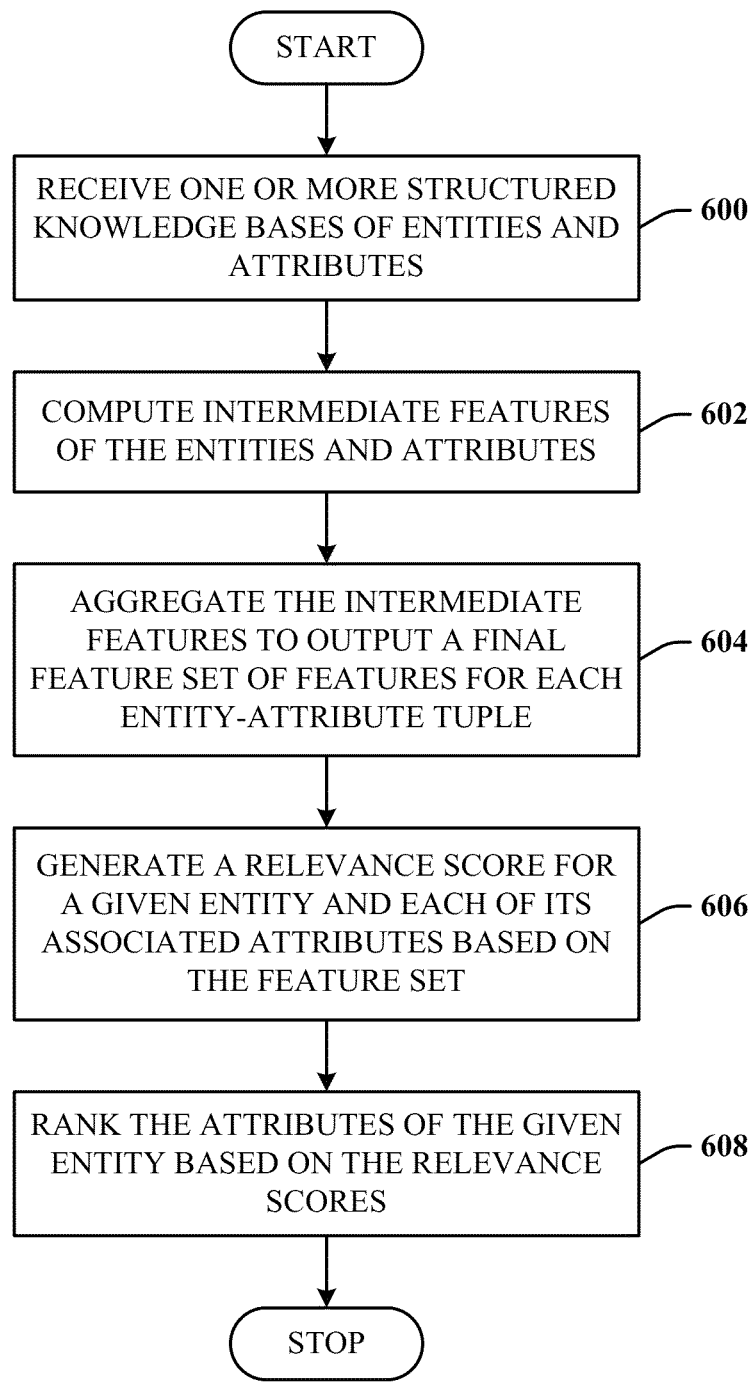
FIG. 6 illustrates a method in accordance with the disclosed architecture.

FIG. 6 illustrates a method in accordance with the disclosed architecture. The method can be performed by a computer system executing machine-readable instructions, where the method comprises the following acts. At 600, one or more structured knowledge bases of entities and attributes are received (available). At 602, the intermediate features of the entities and attributes are computed. At 604, the intermediate features are aggregated to output a final feature set of features for each entity-attribute tuple. At 606, a relevance score is generated for a given entity and associated attributes based on the feature set. That is, a score can be generated for the entity and each of the entity attributes. At 608, the attributes of the given entity are ranked based on the relevance scores.

The method can be performed by configuring a microprocessor to execute instructions in a memory, the instruction associated with at least one of the acts of computing, aggregating, generating, or ranking.

The method can further comprise generating entity summaries that, when presented, include a brief description of the entity and lists key attributes and associated values in an order of importance to represent and depict for what the entity is popularly and commonly known. The method can further comprise computing importance of each entity type for each entity as an intermediate feature.

The method can further comprise computing popularity of attributes for each entity type as an intermediate feature. The method can further comprise performing term frequency compensation for each attribute on a global basis as an intermediate feature. The method can further comprise performing term frequency compensation for each entity type as an intermediate feature. The method can further comprise inputting a set of judgments about relevance of each attribute to the associated entity.

The method can further comprise training a machine learned classifier model to generate a relevance score for a given entity and associated attribute. The method can further comprise training the classifier model using the final feature set and the set of judgments to generate the relevance score for the given entity and associated attribute. The method can further comprise training the classifier model using the final feature set and an aggregation function to generate the relevance score for the given entity and associated attribute.

Figure 7:
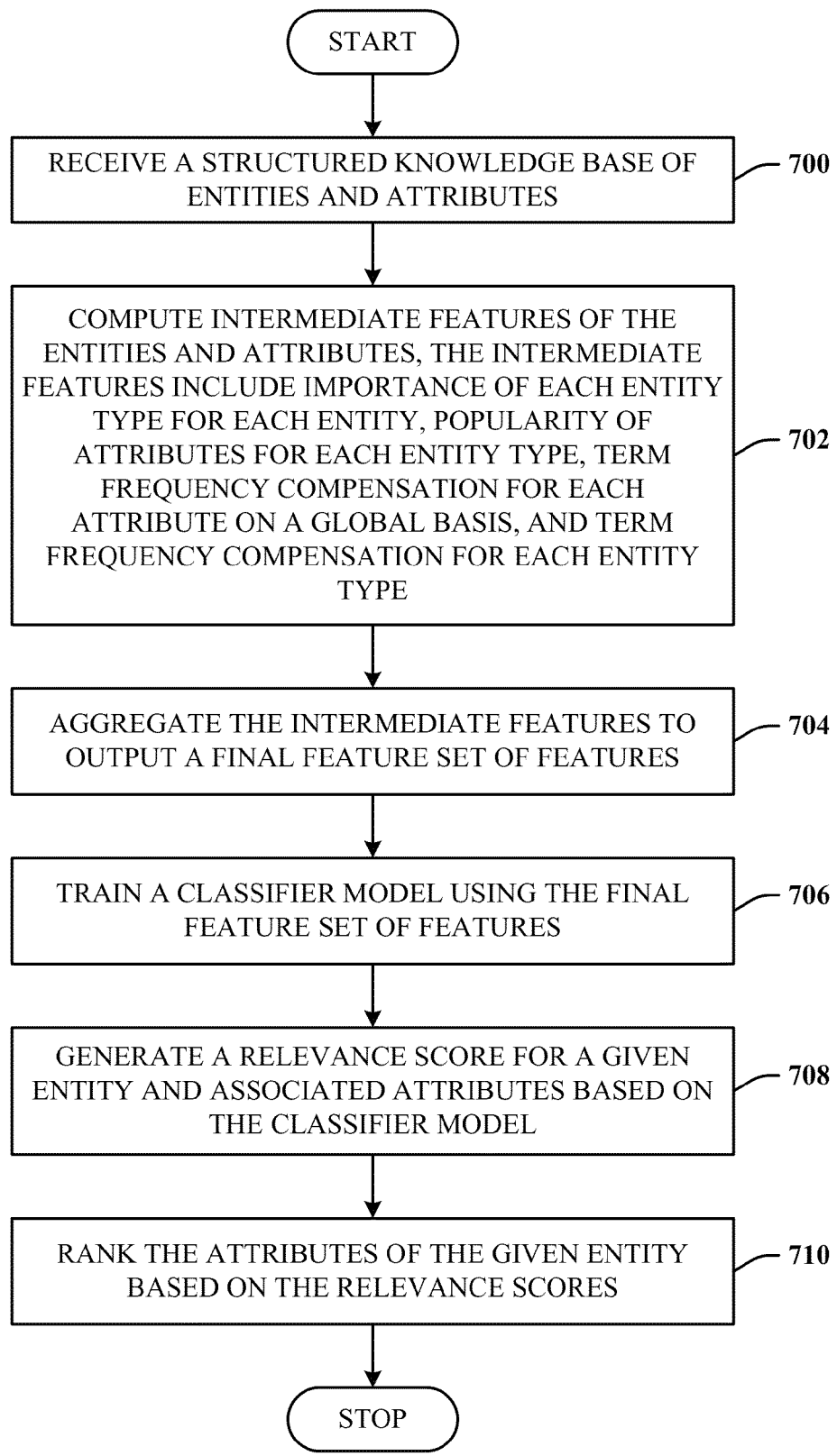
FIG. 7 illustrates alternative method in accordance with the disclosed architecture.

FIG. 7 illustrates an alternative method in accordance with the disclosed architecture. The method can be performed by a computer system executing machine-readable instructions, where the method comprises the following acts. At 700, a structured knowledge base of entities and attributes is received. At 702, intermediate features of the entities and attributes are computed. The intermediate features include importance of each entity type for each entity, popularity of attributes for each entity type, term frequency compensation for each attribute on a global basis, and term frequency compensation for each entity type. At 704, the intermediate features are aggregated to output a final feature set of features. At 706, a classifier model is trained using the final feature set of features. At 708, a relevance score is generated for a given entity and associated attributes based on the classifier model. At 710, the attributes of the given entity are ranked based on the relevance scores.

The model can be performed by configuring a microprocessor to execute instructions in a memory associated with at least one of the acts of computing, aggregating, training, generating, or ranking.

The method can further comprise training the classifier model using the final feature set and the set of human judgments to generate the relevance score for the given entity and associated attribute. The method can further comprise training the classifier model using the final feature set and an aggregation function to generate the relevance score for the given entity and associated attribute.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
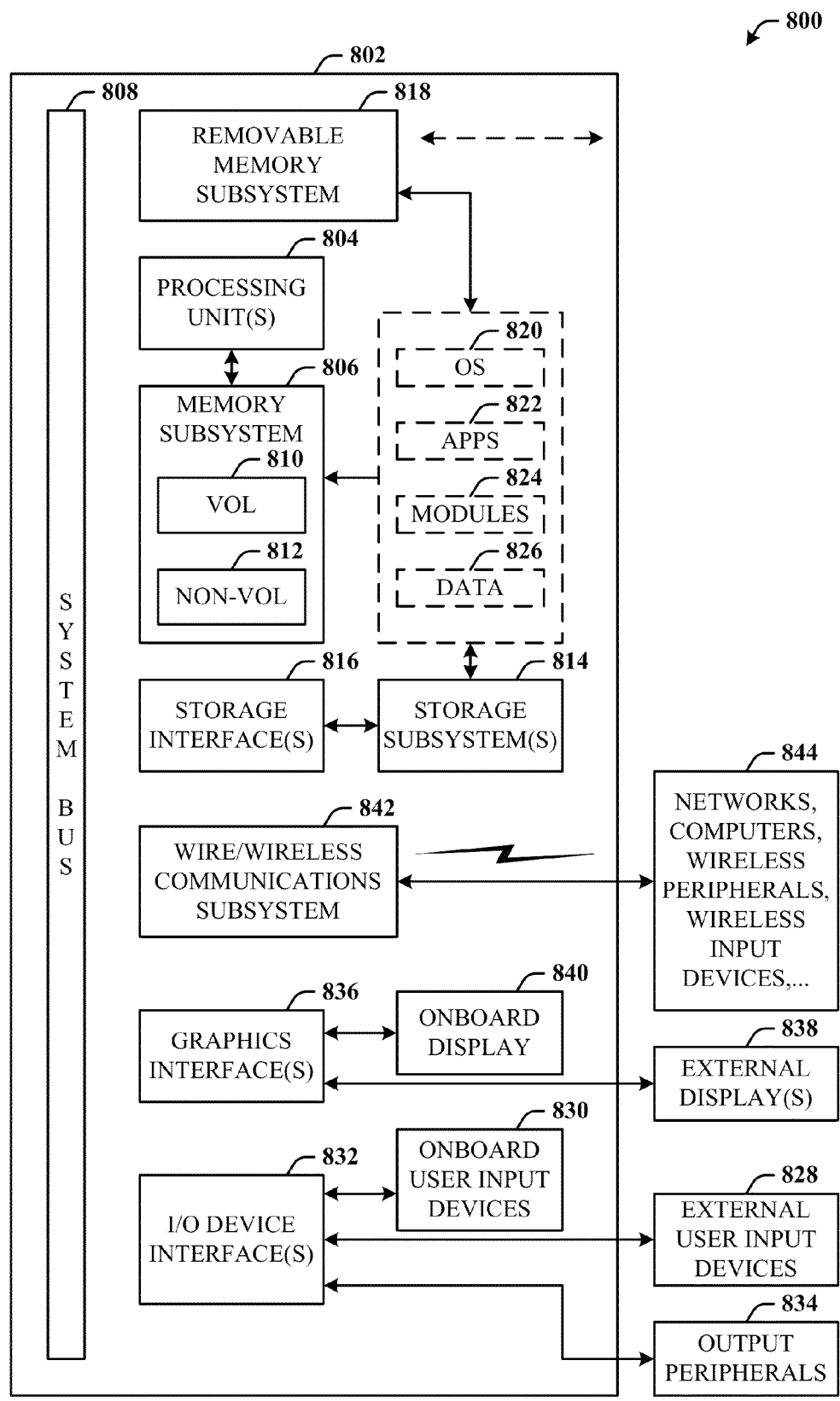
FIG. 8 illustrates a block diagram of a computing system that executes relevant attribute ranking for entities in a structured knowledge base in accordance with the disclosed architecture.

Referring now to FIG. 8, there is illustrated a block diagram of a computing system 800 that executes relevant attribute ranking for entities in a structured knowledge base in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804 (also referred to as microprocessor(s) and processor(s)), a computer-readable storage medium such as a system memory 806 (computer readable storage medium/media also include magnetic disks, optical disks, solid state drives, external memory systems, and flash memory drives), and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 802 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 806 can include computer-readable storage (physical storage) medium such as a volatile (VOL) memory 810 (e.g., random access memory (RAM)) and a non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and/or program data 826 can include entities and components of the system 100 of FIG. 1, entities and components of the system 200 of FIG. 2, entities and components of the system 300 of FIG. 3, entities and components of the summary 400 of FIG. 4, entities and components of the summary 500 of FIG. 5, and the methods represented by the flowcharts of FIGS. 6 and 7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) can be any available media (medium) that do (does) not employ propagated signals, can be accessed by the computer 802, and includes volatile and non-volatile internal and/or external media that is removable and/or non-removable. For the computer 802, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 802, programs, and data using external user input devices 828 such as a keyboard and a mouse, as well as by voice commands facilitated by speech recognition. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example.

These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    at least one knowledge base of entities, entity types, and entity attributes;
    a features component configured to compute a plurality of intermediate features of the entities and attributes for each entity, and aggregate the intermediate features to output a final feature set of features having an entity-attribute tuple corresponding to the respective plurality of computed intermediate features;
    a relevance component configured to generate a relevance score for a given entity and associated attributes based on the feature set, wherein the relevance of each attribute of the entity is based on a set of judgments from human judges;
    a ranking component configured to rank the attributes of the given entity based on the relevance scores; and
    a microprocessor that executes computer-executable instructions associated with at least one of the features component, relevance component, or the ranking component.

2. The system of claim 1, further comprising a summary component that generates entity summaries that when presented include a brief description of the entity and lists key attributes and associated values in an order of importance to represent and depict for what the entity is popularly and commonly known.

3. The system of claim 1, further comprising a machine learned classifier model that is trained using the feature set to output the relevance scores for the given entity and the associated attributes.

4. The system of claim 3, wherein the classifier model is trained to generate a relevance score for a given entity and associated attribute.

5. The system of claim 3, wherein the classifier model is trained using the final feature set and the set of judgments to generate the relevance score for the given entity and associated attribute.

6. The system of claim 1, wherein the features component computes importance of each entity type for each entity as an intermediate feature, and computes popularity of the attributes for each entity type as an intermediate feature.

7. The system of claim 1, wherein the features component computes term frequency compensation for each attribute on a global basis as an intermediate feature, and term frequency compensation for each entity type as an intermediate feature.

8. A method performed by a computer system executing machine-readable instructions, the method comprising acts of:
    receiving one or more structured knowledge bases of entities and attributes;
    computing a plurality of intermediate features of the entities and attributes for each entity;
    aggregating the intermediate features to output a final feature set of features having an entity-attribute tuple corresponding to the respective plurality of computed intermediate features;
    generating a relevance score for a given entity and each of its associated attributes based on the feature set;
    ranking the attributes of the given entity based on the relevance scores; and
    configuring a microprocessor to execute instructions in a memory associated with at least one of the acts of computing, aggregating, generating, or ranking.

9. The method of claim 8, further comprising generating entity summaries that when presented include a brief description of the entity and lists key attributes and associated values in an order of importance to represent and depict for what the entity is popularly and commonly known.

10. The method of claim 8, further comprising computing importance of each entity type for each entity as an intermediate feature.

11. The method of claim 8, further comprising computing popularity of attributes for each entity type as an intermediate feature.

12. The method of claim 8, further comprising performing term frequency compensation for each attribute on a global basis as an intermediate feature.

13. The method of claim 8, further comprising performing term frequency compensation for each entity type as an intermediate feature.

14. The method of claim 8, further comprising inputting a set of judgments about relevance of each attribute to the associated entity.

15. The method of claim 14, further comprising training a machine learned classifier model to generate a relevance score for a given entity and associated attribute.

16. The method of claim 15, further comprising training the classifier model using the final feature set and the set of judgments to generate the relevance score for the given entity and associated attribute.

17. The method of claim 15, further comprising training the classifier model using the final feature set and an aggregation function to generate the relevance score for the given entity and associated attribute.

18. A method performed by a computer system executing machine-readable instructions, the method comprising acts of:
    receiving a structured knowledge base of entities and attributes;
    computing intermediate features of the entities and attributes, the intermediate features include importance of each entity type for each entity, popularity of attributes for each entity type, term frequency compensation for each attribute on a global basis, and term frequency compensation for each entity type;
    aggregating the intermediate features to output a final feature set of features;
    training a classifier model using the final feature set of features, the training based on a set of human judgments from human judges;
    generating a relevance score for a given entity and associated attributes based on the classifier model;
    ranking the attributes of the given entity based on the relevance scores; and
    configuring a microprocessor to execute instructions in a memory associated with at least one of the acts of computing, aggregating, training, generating, or ranking.

19. The method of claim 18, further comprising training the classifier model using the final feature set and the set of human judgments to generate the relevance score for the given entity and associated attribute.

20. The method of claim 18, further comprising training the classifier model using the final feature set and an aggregation function to generate the relevance score for the given entity and associated attribute.

* * * * *